United States Patent [19]
Kawakubo et al.

[11] Patent Number: 5,960,761
[45] Date of Patent: Oct. 5, 1999

[54] ENGINE WITH BALANCER DEVICE FOR VEHICLE

[75] Inventors: Hiroyuki Kawakubo; Tadashi Katoh; Atsushi Ogasawara, all of Saitama, Japan

[73] Assignee: Honda Giken Kogyo Kabushiki Kaisha, Tokyo, Japan

[21] Appl. No.: 08/887,936

[22] Filed: Jul. 3, 1997

[30] Foreign Application Priority Data

Jul. 3, 1996 [JP] Japan .................................... 8-173532
Feb. 26, 1997 [JP] Japan .................................... 9-042429

[51] Int. Cl.$^6$ .................................................. F02B 75/06
[52] U.S. Cl. ........................................................ 123/192.2
[58] Field of Search ............................. 123/192.2; 74/603

[56] References Cited

U.S. PATENT DOCUMENTS 5,038,731 8/1991 Shimada ................................ 123/192.2

FOREIGN PATENT DOCUMENTS

A-4-277349 10/1992 Japan .

Primary Examiner—Noah P. Kamen
Attorney, Agent, or Firm—Birch, Stewart, Kolasch & Birch, LLP.

[57] ABSTRACT

To suitably keep the weight balance of an engine while reducing a radial dimension of the engine. A crank shaft and a transmission shaft are supported in casings and are disposed to be substantially parallel to each other. A rear balancer and a front balancer are disposed with the crank shaft placed therebetween. An AC generator is disposed at an end portion of the crank shaft on the left side with respect to a plane passing through a center of gravity of an engine and being perpendicular to the crank shaft. A clutch is disposed at an end portion of the transmission shaft on the right side with respect to the plane. The clutch is separated from the plane at a distance smaller than that between the AC generator and the plane, so that the weight balance of the engine is suitably maintained by disposing the rear balancer and the front balancer on the clutch side.

23 Claims, 12 Drawing Sheets

ENGINE WITH BALANCER DEVICE FOR VEHICLE

BACKGROUND OF THE INVENTION

1. Field of the Invention

The present invention relates to an engine with a balancer device for use in a vehicle. A crank shaft and a transmission shaft are supported in casings in such a manner so as to be in parallel to each other. Balancers are provided in proximity to the crank shaft.

2. Description of Related Art

An engine with a balancer device is set forth, for example, in Japanese Patent Laid-open No. Hei 4-277349. The above-described related art engine has disadvantages since an AC generator is supported on a specialized shaft connected to and rotated by a crank shaft. The number of parts is increased and the radial dimension of the engine as seen from the crank shaft is enlarged.

To solve the above problem, there may be considered a measure of supporting the AC generator at an axial end portion of the crank shaft. However, in this case, since the axial end portion of the crank shaft is apart from a center of gravity of the engine, consideration must be given to prevent the weight balance of the engine in the direction of the crank shaft from being lost by the weight of the AC generator.

SUMMARY AND OBJECTS OF THE INVENTION

In view of the foregoing, the present invention has been made, and an object of the present invention is to suitably keep the weight balance of an engine while reducing the radial dimension of the engine.

To achieve the above object, according to the present invention, there is provided an engine with a balancer device for a vehicle, in which a crank shaft and a transmission shaft are supported in casings in such a manner so as to be in parallel to each other. Balancers are provided in proximity to the crank shaft. An AC generator is disposed at an end portion of the crank shaft on one side with respect to a plane passing through a center of gravity of an engine. A clutch is disposed at an end portion of the transmission shaft on the other side with respect to the plane in such a manner as to be separated from the plane at a distance smaller than that between the AC generator and the plane. The balancers are disposed between the plane and the clutch.

According to the present invention, in addition to the configuration of the invention described above, the balancers are supported on journal supporting walls of the casings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, embodiments of the present invention will be described with reference to the accompanying drawings. FIGS. 1 to 9 show one embodiment of the present invention.

Figure 1:
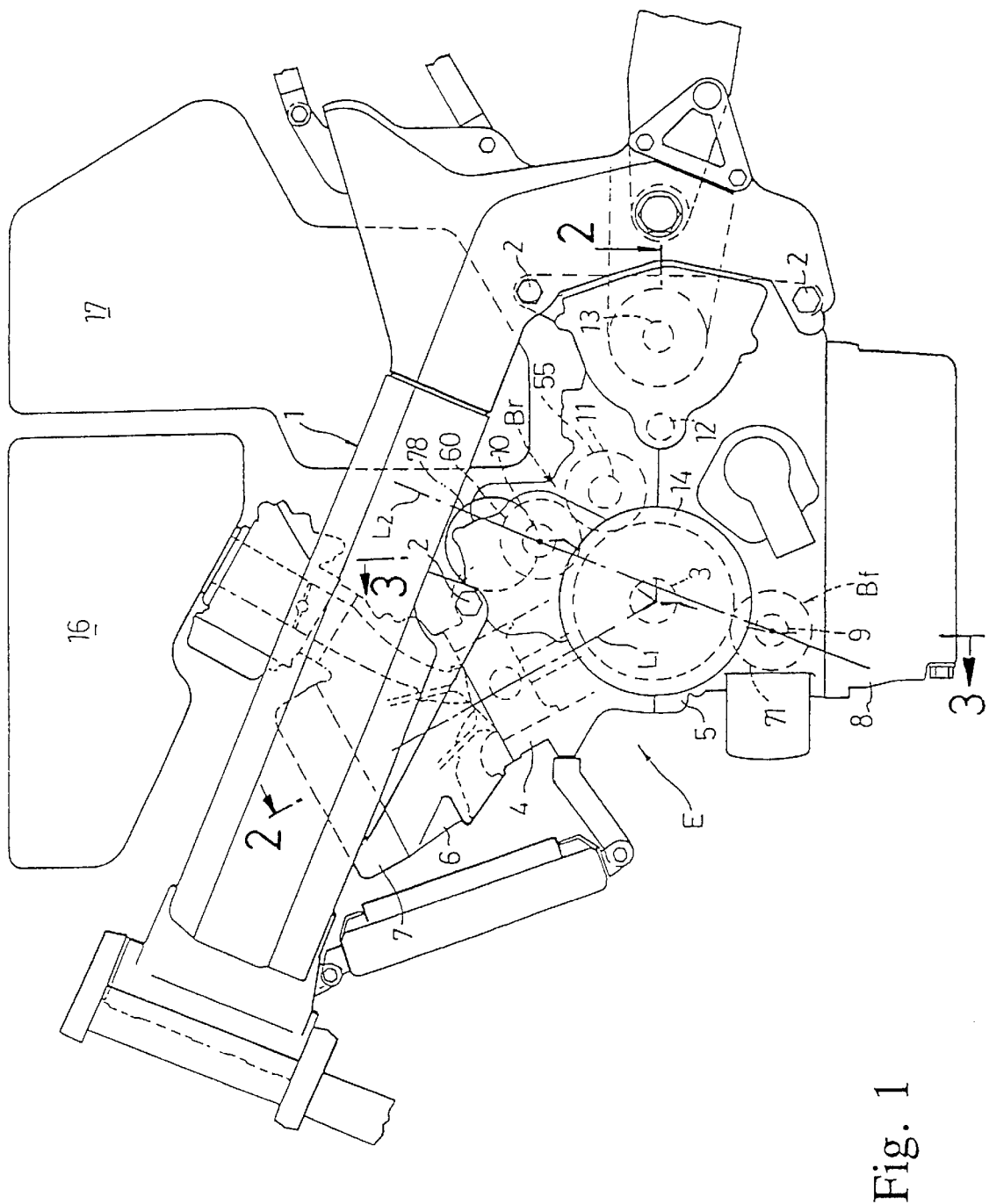
FIG. 1 is a side view showing the entire configuration of an engine mounted on a motorcycle.
Figure 2:
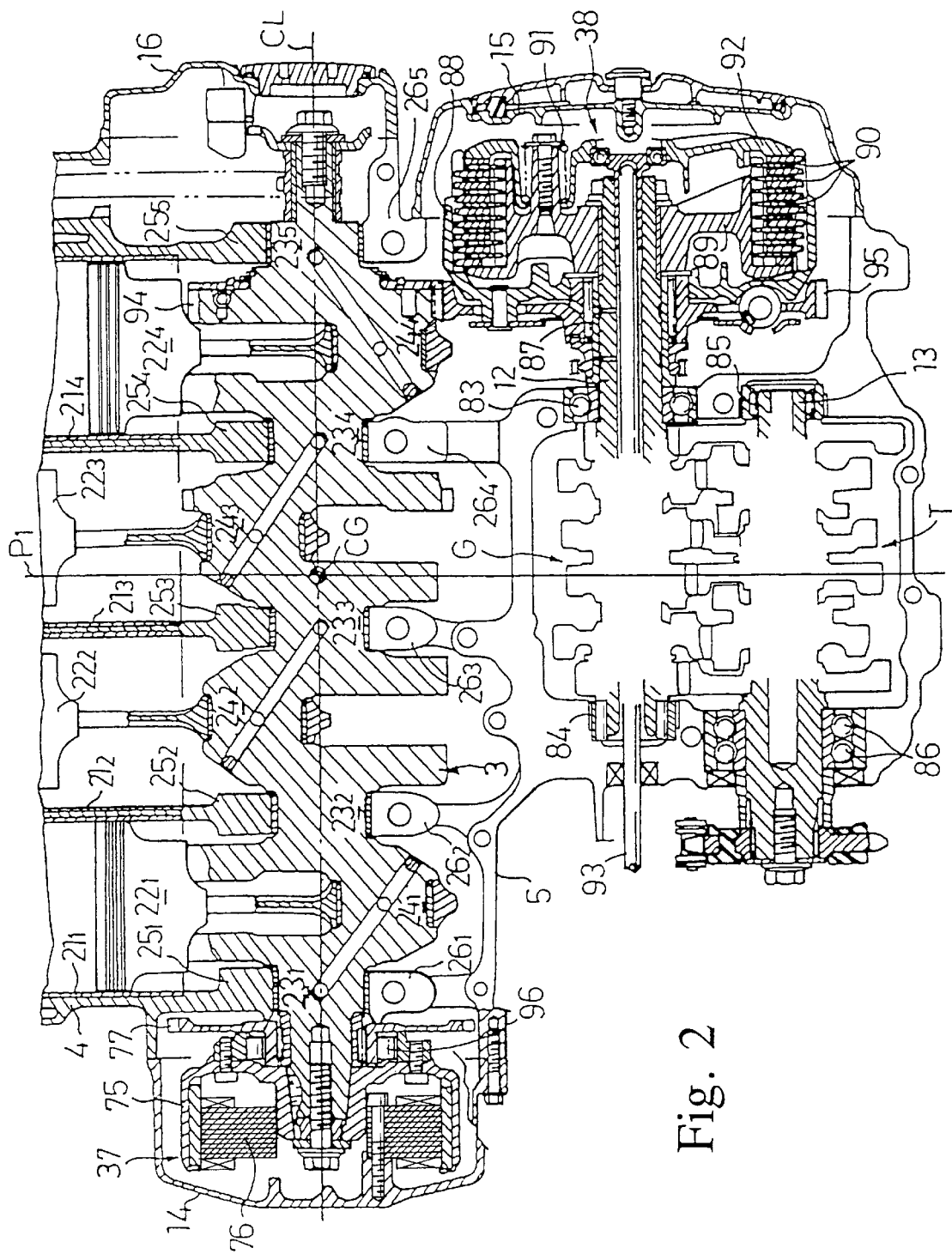
FIG. 2 is a sectional view taken on line 2—2 of FIG. 1.
Figure 3:
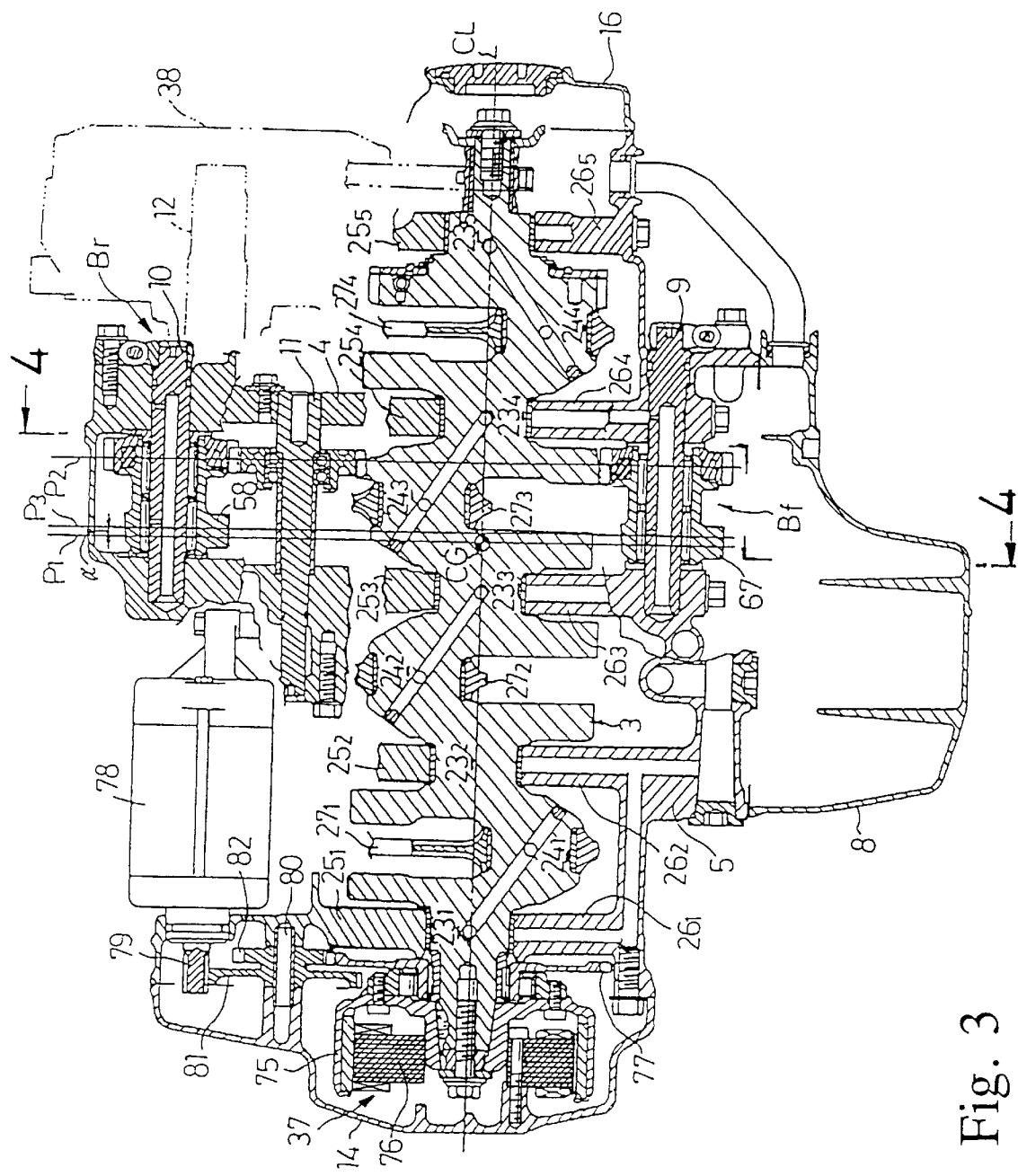
FIG. 3 is a sectional view taken on line 3—3 of FIG. 2.

Referring to FIGS. 1 to 3, an in-line four-cycle engine E is supported on a body frame 1 of a motorcycle by three bolts 2, . . . , 2. Within the engine E, a crank shaft 3 is disposed in a right to left direction of the body and a cylinder axial line $L_1$ is tilted forward and upwardly with respect to the body. A casing of the engine E includes an upper casing 4, a lower casing 5, a cylinder head 6, a head cover 7, and an oil pan 8. The upper casing 4 is composed of an upper half of a crank case, an upper half of a transmission case, and a cylinder block. The lower casing 5 is composed of a lower half of the crank case and a lower half of the transmission case. The cylinder head 6 is connected to an upper end of a cylinder block of the upper casing 4. The head cover 7 is connected to an upper end of the cylinder head 6. The oil pan 8 is connected to a lower surface of the lower casing 5. An AC generator cover 14 is connected to a left side surface of the casing in such a manner so as to extend over the upper casing 4 and the lower casing 5. A clutch cover 15 and a timing chain chamber cover 16 are connected to a right side surface of the casing in such a manner so as to extend over the upper casing 4 and the lower casing 5.

The engine E has a secondary balancer device for reducing secondary vibration. The secondary balancer device is composed of a front balancer Bf and a rear balancer Br. The front balancer Bf includes a front balancer shaft 9 disposed at a position lower than the crank shaft 3 and slightly offset to the front side of the body. The rear balancer Br includes a rear balancer shaft 10 and an idle shaft 11. The rear balancer shaft 10 is disposed at a position higher than the crank shaft 3 and offset to the rear side of the body, and the idle shaft 11 is disposed under the rear balancer shaft 10 in such a manner so as to be offset rearwardly from the rear balancer shaft 10. The front balancer shaft 9 and the rear balancer shaft 10 are substantially symmetric with respect to the crank shaft 3.

A transmission T is contained in rear portions of the upper casing 4 and the lower casing 5. The transmission T includes a main shaft 12 positioned behind the crank shaft 3 and a counter shaft 13 positioned behind the main shaft 12.

Referring to FIGS. 2, 3, the upper casing 4 contains first and fourth cylinders $21_1$ to $21_4$ into which first to fourth pistons $22_1$ to $22_4$ are slidably fitted, respectively. The crank shaft 3 includes first to fifth journal portions $23_1$ to $23_5$, and first and fourth pin portions $24_1$ to $24_4$ provided between these first to fifth journal portions $23_1$ to $23_5$, respectively. The first to fifth journal portions $23_1$ to $23_5$ are rotatably supported by first to fifth journal supporting portions $25_1$ to $25_5$ formed in the upper casing 4 and first to fifth journal supporting portions $26_1$ to $26_5$ formed in the lower casing 5. The first to fourth pin portions $24_1$ to $24_4$ are connected to the first to fourth pistons $22_1$ to $22_4$ by first to fourth connecting rods $27_1$ to $27_4$, respectively.

The first to fifth journal supporting portions $26_1$ to $26_5$ of the lower casing 5 and the first to fifth journal supporting portions $25_1$ to $25_5$ of the upper casing 4 are integrally joined to each other by five portions of the front casing fastening bolts 14, . . . , 14 disposed ahead of the crank shaft 3 and five portions of rear casing fastening bolts 15, . . . , 15 disposed behind the crank shaft 3. The rigidity of the upper and lower casings 4, 5 are thus increased by the above fastening forces of the bolts 14, . . . , 14, and 15, . . . , 15.

Specifically, the lower casing 5 supporting the front balancer shaft 9 is fastened by the front casing fastening bolts 14, . . . , 14 and the rear casing fastening bolts 15, . . . , 15 each of which is made of a steel having a higher modulus of longitudinal elasticity (Young's modulus) than an aluminum alloy used as a material for the lower casing 5. Accordingly, the rigidity of the front balancer supporting portion of the lower casing 5 is enhanced.

Figure 4:
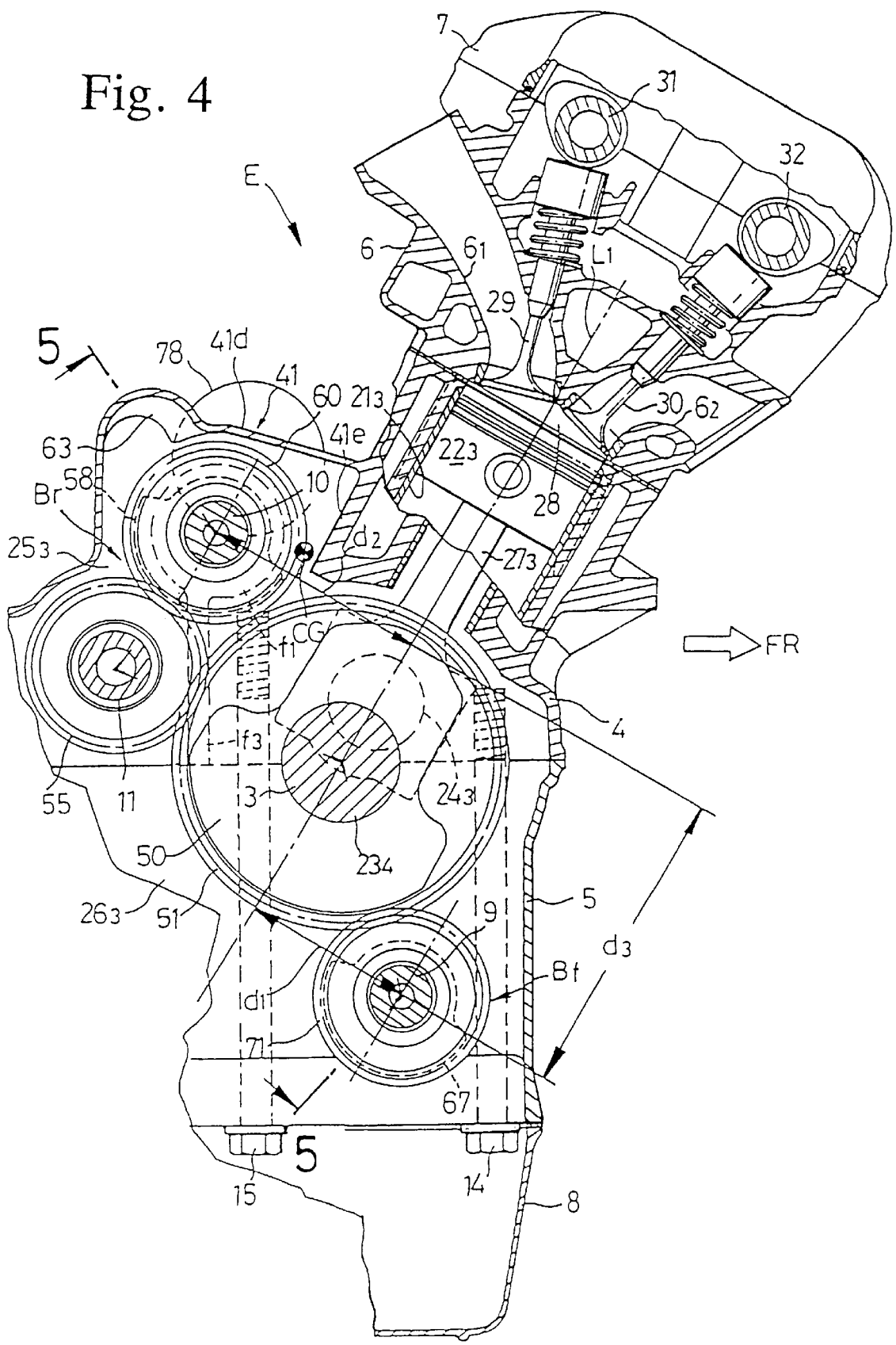
FIG. 4 is a sectional view taken on line 4—4 of FIG. 3.

As illustrated in FIG. 4, a combustion chamber 28 corresponds to each of the cylinders $21_1$ to $21_4$ and is formed in the cylinder head 6. Intake valves 29, 29 and exhaust valves 30, 30 are, respectively, provided in intake ports $6_1$, $6_1$ and exhaust ports $6_2$, $6_2$ connected to the combustion chamber 28. The intake valves 29, 29 and exhaust valves 30, 30 are driven by an intake cam shaft 31 and an exhaust cam shaft 32 supported on a connection surface of the cylinder head 6 and a cam shaft holder (not shown).

A drive sprocket 33 and a timing chain chamber 35 are provided on a right end surface of the Engine E. The drive sprocket 33 is provided at a right end of the crank shaft 3. The timing chain chamber 35 contains a timing chain 34 for transmitting rotation of the drive sprocket 33 to the intake cam shaft 31 and the exhaust cam shaft 32. An opening portion communicates to the exterior, which is formed in part by the timing chain chamber 35, and is covered with the timing chain chamber cover 16.

An AC generator 37 includes a rotor 75 and a stator 76. The rotor 75 is fixed on a left end of the crank shaft 3. The stator 76 is supported on the AC generator cover 14 in such a manner as to face to the inner periphery of the rotor 75. A starter driven gear 77 is fixed on the rotor 75 through a one-way clutch 96. A starter drive gear 79 is rotated by a starter motor 78 (see FIG. 1) provided on the upper casing 4 behind the cylinders $21_1$ to $21_4$. This starter drive gear 79 and the starter driven gear 77 are connected to each other through a first intermediate gear 81 and a second intermediate gear 82 supported on an intermediate shaft 80. When the starter motor 78 is driven, the crank shaft 3 is rotated via the starter drive gear 79, first intermediate gear 81, second intermediate gear 82, starter driven gear 77, one-way clutch 96 and rotor 75. The engine E is thus started.

The main shaft 12 is supported on a mating face of the upper casing 4 and the lower casing 5 through a ball bearing 83 and a needle bearing 84. The counter shaft 13 is supported on the above mating face through a needle bearing 85 and a ball bearing 86. A speed change gear train G for selectively establishing a plurality of speed change steps is provided between the main shaft 12 and the counter shaft 13.

A starting clutch 38 provided at a right side of the main shaft 12 includes a clutch outer 88, a clutch inner 89, a plurality of friction plates 90, . . . , 90, a clutch piston 92, and a rod 93. The clutch outer 88 is supported around an outer periphery of the main shaft 12 through a needle bearing 87. The clutch inner 89 is fixed at a right end of the main shaft 12. The friction plates 90, . . . , 90 are slidably supported on the clutch outer 88 and the clutch inner 89. The clutch piston 92 is biased by an elastic force of a spring 91 in the direction of engaging the friction plates 90, . . . , 90. The rod 93 is slidably supported in the main shaft 12 and biases the clutch piston 92 in the direction where the engagement is released against the elastic force of the spring 91. A drive gear 94 provided on a weight portion at a right end of the crank shaft 3 meshes with a driven gear 95 provided on the clutch outer 88.

When the clutch 38 is in the engagement state, the rotation of the crank shaft 3 is transmitted to the main shaft 12 via the drive gear 94, driven gear 95, clutch outer 88, friction plates 90, . . . , 90 and clutch inner 89.

Figure 5:
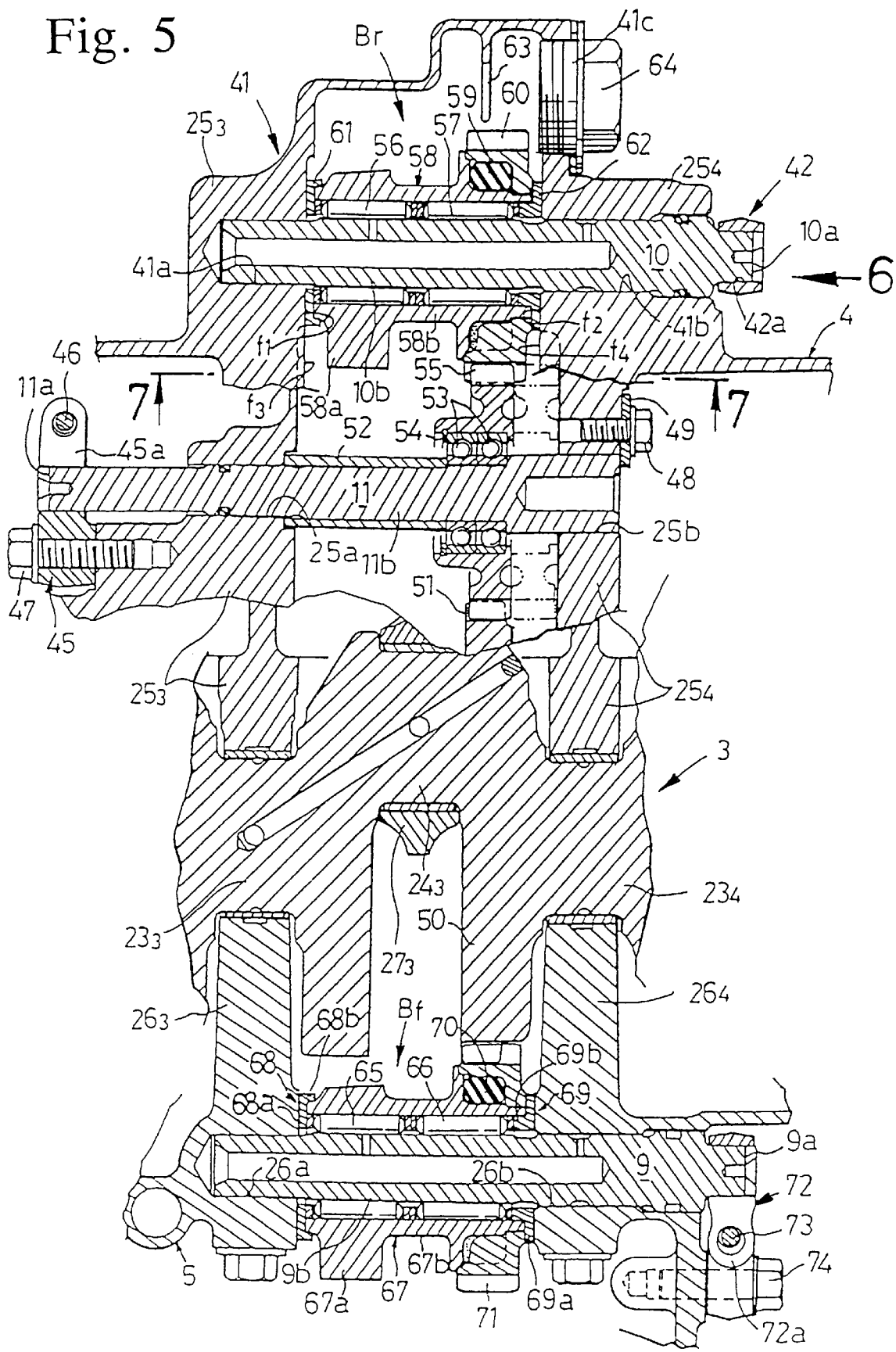
FIG. 5 is a sectional view taken on line 5—5 of FIG. 4.
Figure 6:
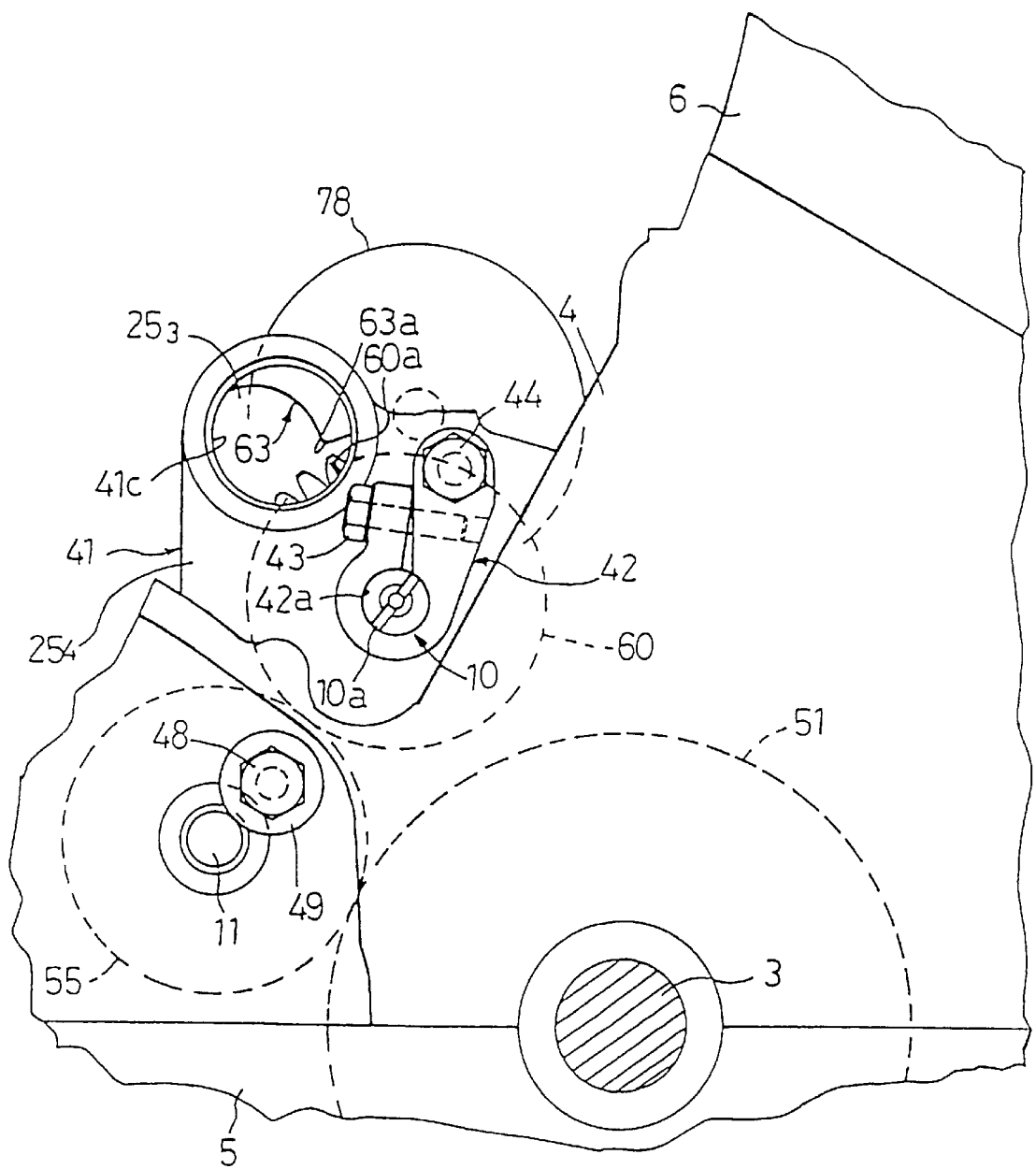
FIG. 6 is a view seen from an arrow 6 of FIG. 5.

Referring to FIGS. 4 to 6, right and left ends of the idle shaft 11 of the rear balancer Br are hung between the third journal supporting portion $25_3$ and the fourth journal supporting portion $25_4$ which are formed in the upper casing 4 for supporting the third journal portion $23_3$ and the fourth journal portion $23_4$ of the crank shaft 3. A casing raised portion 41 is formed by extending the third journal supporting portion $25_3$ and fourth journal supporting portion $25_4$ outwardly from an outer wall of the upper casing 4. The casing raised portion 41 extends from a rear surface of the cylinder block to the upper surface of the upper casing 4.

The casing raised portion 41 has a ceiling wall portion 41$d$ and a cylinder side wall portion 41$e$. The ceiling wall portion 41$d$ covers an upper surface and a rear surface of the casing raised portion 41. The cylinder side wall portion 41$e$, which is continuous to a front portion of the ceiling wall portion 41$d$, constitutes a side wall of the third cylinder $21_3$. Thus, a high rigidity box structure which is opened downwardly is formed by the third journal supporting portion $25_3$, fourth journal supporting portion $25_4$, ceiling wall portion 41$a$, and cylinder side wall portion 41$e$. Right and left ends of the rear balancer shaft 10 of the rear balancer Br are hung on the third journal supporting portion $25_3$ and the fourth journal supporting portion $25_4$ constituting the right and left side walls of the casing raised portion 41.

The rear balancer shaft 10 is inserted in a supporting hole 41$b$ and in a supporting hole 41$a$ from the supporting hole 41$b$ side. The supporting hole 41$b$ is a through-hole formed in the fourth journal supporting portion $25_4$, and the supporting hole 25$b$ is a blind hole formed in the third journal supporting portion $25_3$. The rear balancer shaft 10 is then fixed by a fixing member 42 at an end portion thereof projecting outwardly from the fourth journal supporting portion $25_4$. As will be described later, the rear balancer shaft 10 is an eccentric shaft. A phase of an eccentric portion 10$b$ can be adjusted by turning the rear balancer shaft 10 using a tool engaged in a groove 10$a$ formed at the right end thereof The fixing member 42, fixes the rear balancer shaft 10 to not allow rotation and axial movement. The fixing member 42 is formed in an approximately J-shape. After adjustment of the phase of the eccentric portion 10$b$, the right end of the rear balancer shaft 10 is held in a slit 42$a$ of the fixing member 42, followed by fastening by a bolt 43. The fixing member 42 is fixed on the fourth journal supporting portion $25_4$ of the casing raised portion 41 by a bolt 44.

The idle shaft 11 is inserted in a supporting hole 25b and in a supporting hole 25a from the fourth journal supporting portion $25_4$ side. The supporting hole 25b is a through hole formed in the fourth journal supporting portion $25_4$, and the supporting hole 25a is a through hole formed in the third journal supporting portion $25_3$. The idle shaft 11 is then fixed by a fixing member 45 and bolts 46, 47 at an end portion thereof passing through the third journal supporting portion $25_3$. A right end of the idle shaft 11 is axially positioned by a washer 49 fixed on the fourth journal supporting portion $25_4$ by a bolt 48. The idle shaft 11 is composed of an eccentric shaft. The phase of an eccentric portion 11b can be adjusted before fixing the idle shaft 11 by turning the idle shaft 11 using a tool engaged in a groove 11a formed at the right end thereof A balancer drive gear 51 is integrally formed on an outer periphery of a balancer portion 50 adjacent to the left side of the fourth journal portion $23_4$ of the crank shaft 3. Ball bearings 53, 53 are axially positioned on an outer periphery of the eccentric portion 11b of the idle shaft 11 through a collar 52. An idle gear 55 is removably supported by the ball bearings 53, 53 through a clip 54 which meshes with the balancer drive gear 51.

Figure 8:
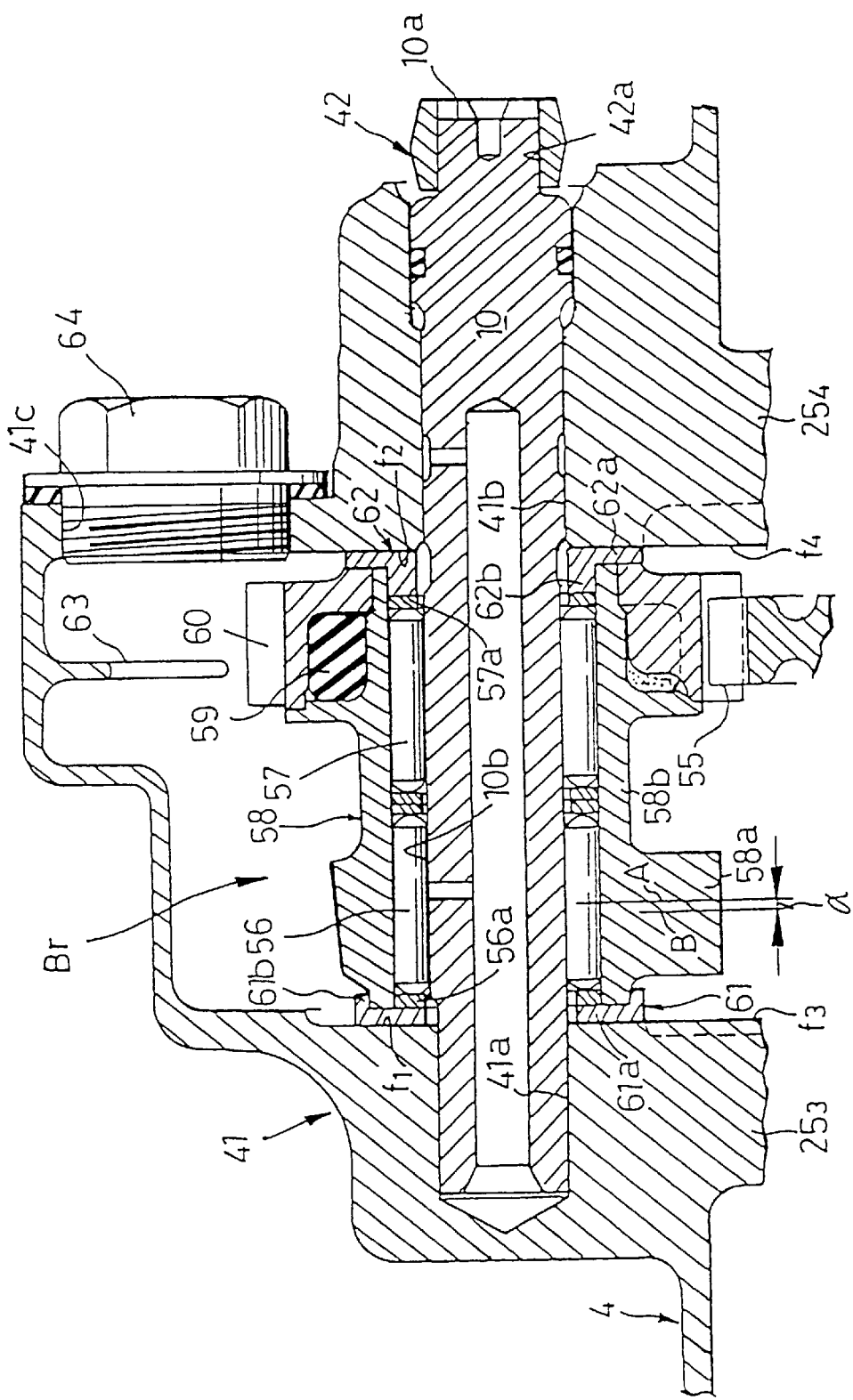
FIG. 8 is an enlarged view showing an essential portion of FIG. 5.

Referring particularly to FIG. 8, a rear balancer weight 58 is rotatably supported on an outer periphery of the eccentric portion 10b of the rear balancer shaft 10 through a first needle bearing 56 and a second needle bearing 57. The rear balancer weight 58 is composed of a weight portion 58a and a cylindrical shaft portion 58b. A rear balancer gear 60 supported on an outer periphery of the cylindrical shaft portion 58b through a plurality of damper rubbers 59, . . . , 59 meshes with the idle gear 55. A first thrust washer 61 and a second thrust washer 62 are disposed between right and left ends of the rear balancer weight 58 and the third journal supporting portion $25_3$ and fourth journal supporting portion $25_4$ of the casing raised portion 41, respectively. The weight portion 58a of the rear balancer weight 58 is disposed adjacent to the third journal supporting portion $25_3$ of the casing raised portion 41 so as not to interfere with a large diameter end portion of the third connecting rod $27_3$.

The first thrust washer 61 disposed between the third journal supporting portion $25_3$ of the casing raised portion 41 and the rear balancer weight 58 includes an annular shaped cylindrical holding portion 61b extending on the rear balancer weight 58 side. The cylindrical holding portion 61b is formed on the outer periphery of a main body portion 61a of the first thrust washer 61. A left side surface of the main body portion 61a supports a thrust force generated between a thrust washer supporting surface $f_1$ of the third journal supporting portion $25_3$ and the same. A right side surface of the main body portion 61a supports a thrust force generated between the left end portion of the rear balancer weight 58 and the same, and a thrust force generated between the retainer 56a of the first needle bearing 56 and the same. The first thrust washer 61 is radially positioned with respect to the rear balancer weight 58 by engagement of the inner peripheral surface of the cylindrical holding portion 61b with the outer peripheral surface of the left end portion of the rear balancer weight 58.

The second thrust washer 62, disposed between the fourth journal supporting portion $25_4$ of the casing raised portion 41 and the rear balancer weight 58, has a cylindrical supporting portion 62b extending on the rear balancer weight 58 side. The cylindrical holding portion 62b is formed on the inner peripheral portion of a main body portion 62a of the second thrust washer 62. A right side surface of the main body portion 62a supports a thrust force generated between a thrust washer supporting surface $f_2$ of the fourth journal supporting portion $25_4$ and the same. A left side surface of the main body portion 62a supports a thrust force generated between the right end portion of the rear balancer weight 58 and the main body portion 62a, and a thrust force generated between the right end of the rear balancer gear 60 and the main body portion 62a. A left end surface of the cylindrical supporting portion 62b supports a thrust force generated between the retainer 57a of the second needle bearing 57 and the cylindrical supporting portion 62b. The second thrust washer 62 is radially positioned with respect to the rear balanced weight 58 by engagement of an outer peripheral surface of the cylindrical supporting portion 62b with an inner peripheral surface of the right end portion of the rear balancer weight 58.

Figure 7:
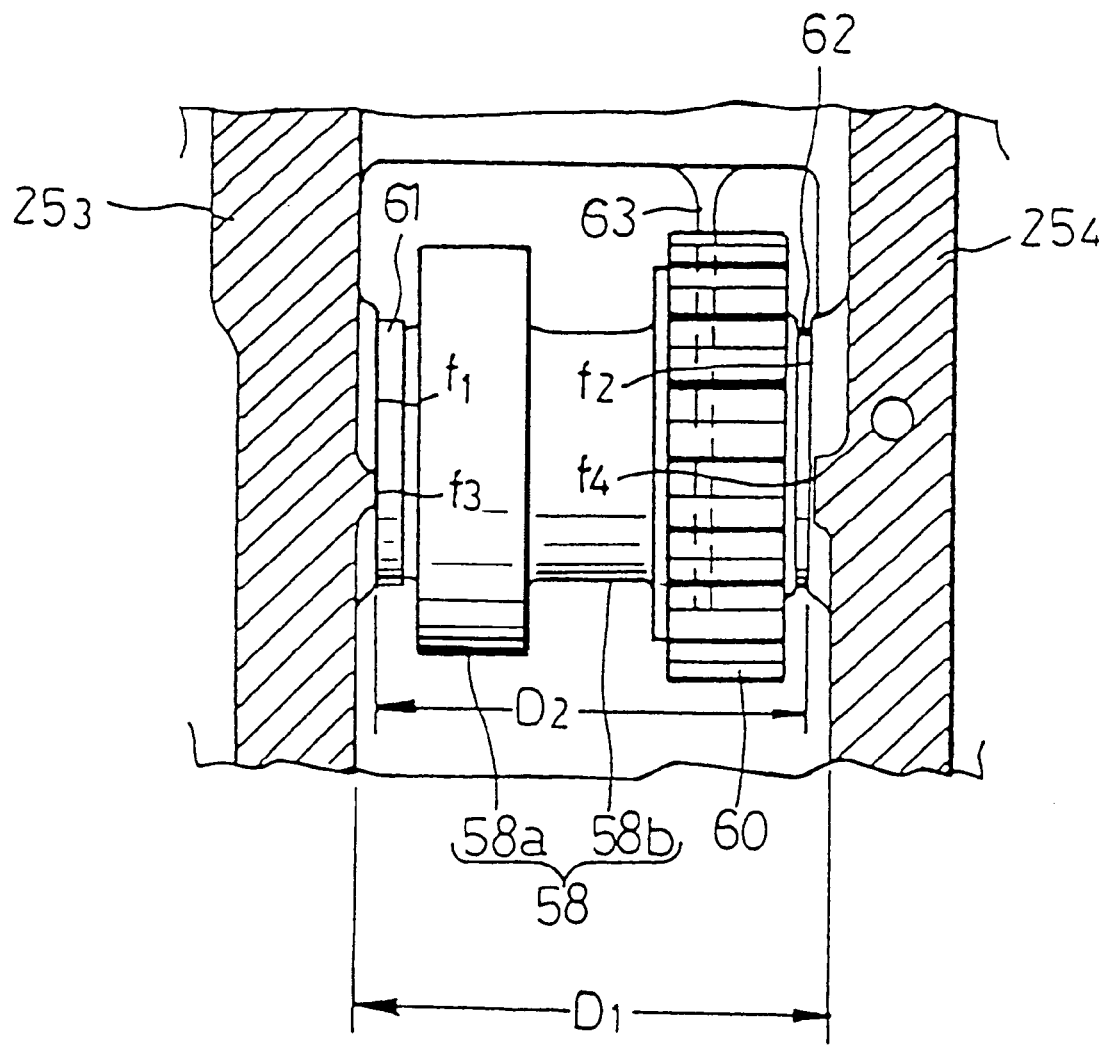
FIG. 7 is a sectional view taken on line 7—7 of FIG. 5.

As is apparent from a comparison between the first and second thrust washers 61, 62 in terms of shape, the first needle bearing 56 can be moved on the main body portion 61a side without any interference with the cylindrical holding portion 61b because the cylindrical holding portion 61b of the first thrust washer 61 is formed on the outer periphery of the main body portion 61a. An axial center line A of the first needle bearing 56 is thus allowed to come closer to a center line B passing through the center of gravity of the weight portion 58a of the rear balances weight 58, so that an offset amount α between both the center lines A and B can be minimized. As a result, an eccentric load applied to the first needle bearing 56 is reduced. This is effective to reduce the volume of the first needle bearing 56 and to improve the durability thereof In the case of assembling the rear balancer weight 58 in the casing raised portion 41, the rear balanced weight 58, rear balancer gear 60, damper rubber 59, . . . 59, first needle bearing 56, second needle bearing 57, first thrust washer 61, and second thrust washer 62 are previously assembled and the sub-assembly thus obtained is assembled in the casing raised portion 41. In a state shown in FIG. 5, in which the sub-assembly is assembled in the casing raised portion 41 at a normal assembling position, the first thrust washer 61 and second thrust washer 62 are brought in contact with the third journal supporting portion $25_3$ and fourth journal supporting portion $25_4$ of the casing raised portion 41, respectively in order to prevent the first and second thrust washers 61, 62 from being slipped off. However, when the sub-assembly is inserted from the opening portion of the upper casing 4 to the above normal assembling position, the first and second thrust washers 61, 62 are easily slipped off from the rear balancer weight 58, resulting in reduced workability. This is because, as shown in FIG. 7, for a reduction in weight, a distance D between opposed faces of the third journal supporting portion $25_3$ and fourth journal supporting portion $25_4$ positioned on both of the sides of the sub-assembly is set to be larger than a distance D2 between the third journal supporting portion $25_3$ and fourth journal supporting portion $25_4$ at the normal assembling position (that is, between $f_1$ and $f_2$). In particular, the sub-assembly is assembled in the deepest portion of the casing raised portion 41, and accordingly it is difficult to withdraw the dropped thrust washer because the operator's hand does not easily reach within this portion.

In this embodiment, as shown in FIGS. 4, 5 and 7, thrust washer guide faces $f_3$, $f_4$ extend continuously from the opening portion of the upper casing 4 to the thrust washer supporting faces $f_1$, $f_2$ and project on the opposed faces of the third journal portion $25_3$ and fourth journal supporting portion $25_4$. The thrust washer supporting face $f_1$ and the thrust guide face $f_3$, which are positioned on the left side, are formed to be at the same level. The thrust washer supporting face $f_2$ and the thrust guide face $f_4$, which are positioned on the right side, are formed to be at the same level. Each distance between a pair of the opposed thrust washer supporting faces $f_1$, $f_2$ and a distance between a pair of the opposed thrust guide faces $f_3$, $f_4$ is equal to the distance D2.

Thus, in the case where the sub-assembly of the rear balancer 58 is inserted in the casing raised portion 41 up to the normal assembling position, the first thrust washer 61 and the second thrust washer 62 of the subassembly are brought into contact with a pair of the thrust washer guide faces $f_3$, $f_4$ continuously from the opening portion of the upper casing 4, and the sub-assembly is inserted in the casing raised portion 41 up to the normal assembling position while being slid in such a state. In this way, the first thrust washer 61 and second thrust washer 62 are guided without being slipped off from the rear balancer weight 58, up to the normal assembling position where they are brought in contact with the right and left thrust washer supporting faces $f_1$, $f_2$. This extremely improves the assembling workability.

As is apparent from FIGS. 4 to 7, an arcuate rib 63 is provided which projects on a bottom portion of the casing raised portion 41. A circular opening portion 41c is formed in the fourth journal supporting portion $25_4$ in order to allow visual observation of the rub 63 through the opening portion 41c. The opening portion 41c can be blocked by a plug 64 (see FIG. 5). A phase alignment mark 63a of the rib 63 as well as part of the rear balancer gear 60 can be visually observed through the opening portion 41c. The rear balancer gear 60 is rotated by the operator's finger inserted through the opening portion 41c to align a phase alignment mark 60a (see FIG. 6) formed in one tooth of the rear balancer gear 60 with the phase alignment mark 63a of the rib 63, thus performing phase alignment of the rear balancer gear 60 at the time of assembly of the rear balancer Br (which will be described later).

When the sub-assembly is inserted in the casing raised portion 41 for assembly therewith, the rear balancer gear 60 is brought into contact with the rib 63 and is roughly positioned as shown in FIGS. 4, 7, so that the rear balancer weight 58 is prevented from being dropped on the bottom portion of the casing raised portion 41. This is effective to facilitate the assembling work.

As shown in FIGS. 4, 8, the front balancer shaft 9 of the front balancer Bf is hung between the third journal supporting portion $26_3$ and fourth journal supporting portion $26_4$ of the lower casing 5. A first needle bearing 65, a second needle bearing 66, a front balancer weight 67 including a weight portion 67a, and a cylindrical shaft portion 67b, a first thrust washer 68, a second thrust washer 69, a damper rubber 70, and a front balancer gear 71 with meshing the balancer drive gear 51 are supported on an outer periphery of the front balance shaft 9. The front balancer shaft 9 is fixed on the lower casing 5 by a fixing member 72 and bolts 73, 74.

As is apparent from FIG. 5, the front balancer Bf is symmetric in structure to the rear balancer Br with respect to the crank shaft 3, except that it does not include members equivalent to the idle shaft 11 and idle gear 55, and therefore, the overlapped explanation thereof is omitted. However, the front balancer Bf is disposed at a relatively shallow position from the opening portion of the lower casing 5, and further it is easy to assemble and phase alignment because it does not include a member equivalent to the idle gear 55, and consequently, the front balancer Bf does not require members equivalent to the thrust washer guide faces $f_3$, $f_4$ of the rear balancer Br and a member equivalent to the rib 63.

Referring to FIG. 5, since a cylindrical holding portion 68b of the first thrust washer 68 of the front balancer Bf is formed on an outer periphery of a main body portion 68a thereof, the first needle bearing 65 can be moved on the main body portion 68a side without interference with the cylindrical holding portion 68b. As a result, the center line of the first needle bearing 65 is allowed to come closer to the center line of the weight portion 67a of the front balancer weight 67. This makes it possible to reduce an eccentric load applied to the first needle bearing 65 of the front balancer Bf, like the rear balancer Br.

The number of teeth of each of the rear balancer gear 60 and the front balancer gear 71 is set to be half the number of teeth of the balancer drive gear 51 provided on the crank shaft 3. Accordingly, the rear balancer gear 60 is rotated in the same direction as that of the crank shaft 3 at a rotational speed being twice that of the crank shaft 3, and the front balancer gear 71 is rotated in the reversed direction to that of the crank shaft 3 at a rotational speed being twice that of the crank shaft 3, thus reducing secondary vibration of the engine E as is well known.

Referring to FIG. 4, it is desired that the front balancer shaft 9 is disposed symmetrically to the rear balancer shaft 10 with respect to the crank shaft 3. Also, if $d_1$ is a distance between the cylinder axial line $L_1$ and the front balancer shaft 9, and $d_2$ is a distance between the cylinder axial line $L_1$ and the rear balancer shaft 10, and $d_3$ is a distance along the cylinder axial line $L_1$ between the front balancer shaft 9 and the rear balancer shaft 10, it is desired that the distance $d_1$ is set to be equal to the distance $d_2$, and the distance $d_3$ is set to be substantially equal to the length of the connecting rods $27_1$ to $27_4$.

The above requirement can be easily satisfied by disposing the front balancer shaft 9 ahead of and under the crank shaft 3 and also disposing the rear balancer shaft 10 behind and above the crank shaft 3. However, since various accessories (for example, the starter motor 78, air cleaner 16, fuel tank 17 and the like shown in FIG. 1) are disposed behind the cylinders $21_1$ to $21_4$ and are tilted forward and upward relative to the body, the rear balancer shaft 10 possibly interferes with the accessories. In this embodiment, since the minimum casing raised portion 41 projects from the upper surface of the upper casing 4 and the rear balancer shaft 10 is contained in the casing raised portion 41, the space behind the cylinders $21_1$ to $21_4$ can be ensured at a maximum and the rear balancer shaft 10 is prevented from interfering with the accessories. Further, since the idle shaft 11 is disposed not ahead of but behind the rear balancer shaft 10, a further large space can be ensured behind the cylinders $21_1$ to $21_4$.

As is apparent from FIG. 5, the rear balancer shaft 10 is supported by the third journal supporting portion $25_3$ and fourth journal supporting portion $25_4$ of the upper casing 4 for supporting the third journal portion $23_3$ and fourth journal portion $23_4$ of the crank shaft 3. The front balancer shaft 9 is supported by the third journal supporting portion $26_3$ and fourth journal supporting portion $26_4$ of the lower casing 5 for supporting the third journal portion $23_3$ and fourth journal portion $23_4$. If the balancer shafts 9, 10 are supported on outer wall portions of the casings 4, 5, the casings 4, 5 must be reinforced for withstanding a centrifugal force applied to the balancer shafts 9, 10, which result in an increase in weight. In this regard, by supporting the balancer shafts 9, 10 using the journal supporting portions $25_3$, $25_4$, $26_3$, $26_4$ each having a high rigidity for supporting the crank shaft 3 as in this embodiment, the casings 4, 5 are not required to be reinforced. This is effective to reduce the weight of the casings 4, 5.

In particular, the connecting rigidity of the journal supporting portions $25_1$ to $25_5$ of the upper casing 4 and the journal supporting portions $26_1$ to $26_5$ of the lower casing 5 are enhanced by the fastening forces of the front fastening bolts 14, . . . , 14 and the rear fastening bolts 15, . . . , 15 each of which is made of steel which has a higher modulus of longitudinal elasticity (Young's modulus) than an aluminum alloy as a material of the upper casing 4. Consequently, the supporting rigidities of the front balancer shaft 9 and the rear balancer shaft 10 supported thereon are improved. Consequently, the vibratory forces (damping forces for suppressing vibration of the crank shaft 9) of the front balancer shaft 9 and the rear balancer shaft 10 act effectively, to thereby suppress the entire vibration of the engine E to a minimum. In particular, since the rear balancer shaft 10 is supported on the casing raised portion 41 of the box-structure opened downwardly and the rear balancer supporting portion is positioned near the fastening portions of the rear fastening bolts 15, . . . , 15, it can ensure a desired rigidity.

Referring to FIG. 3, character CL indicates an axial line of the crank shaft 3, and $P_1$ indicates a first plane passing through the center of gravity CG of the engine E and being perpendicular to the axial line CL. In this embodiment, the first plane $P_1$ is positioned between the third journal portion $23_3$ and the third pin portion $24_3$ of the crank shaft 3. In addition, while the center of gravity CG is depicted on the axial line CL for convenience in FIGS. 2, 3, it is actually spaced upwardly from the axial line CL (see FIG. 4).

The rear balancer Br and the front balancer Bf are disposed on the right side with respect to the first plane $P_1$ passing through the center of gravity CG. The starter motor 78 is disposed on the left side of the first plane $P_1$. The weight portion 58a of the rear balancer weight 58 and the weight portion 67a of the front balancer weight 67 are disposed on a third plane $P_3$ being perpendicular to the axial line CL and being adjacent to the first plane $P_1$ in such a manner as to be slightly spaced rightwardly therefrom at a distance α. The rear drive system (that is, balancer drive gear 51, idle gear 55 and rear balancer gear 60) for driving the rear balancer Br, and the front drive system (that is, balancer drive gear 51 and front balancer gear 71) for driving the front balancer Bf are disposed on a second plane $P_2$ being perpendicular to the axial line CL and being spaced rightwardly from the first plane $P_1$ at a distance larger than the distance between the third plane $P_3$ and the first plane $P_1$.

Since the rear balance Br and the front balancer Bf are disposed on the right side with respect to the first plane $P_1$ passing through the center of gravity CG and being perpendicular to the axial line CL and the starter motor 78 is disposed on the left side with respect to the first plane $P_1$ it is possible to prevent the weight balance of the engine E from being largely deviated on the left side or right side. Further, since the weight portion 58a of the rear balancer weight 58 and the weight portion 67a of the front balancer weight 67 are disposed on the third plane $P_3$ adjacent to the first plane $P_1$, the deviation along the axial line CL between both the weights 58a, 67a as seen from the center of gravity CG can be suppressed at a minimum, thus preventing the occurrence of a coupling vibration.

Since the rear drive system for driving the rear balancer Br and the front drive system for driving the front balancer Bf are disposed on the same plane (on the second plane $P_2$), the balancer drive gear 51 of the crank shaft 3 can be commonly used for both the drive systems and thereby it can be simplified in structure, and also the dimension along the axial line CL of the engine E can be made smaller.

Referring to FIGS. 2, 3, the AC generator 37 provided at the left end of the crank shaft 3 is separated from the first plane $P_1$ passing through the center of gravity CG at a large distance. The clutch 38 provided on the right end of the main shaft 12 of the transmission T is separated from the first plane $P_1$ at a small distance, and from this viewpoint, the weight balance of the engine E around the center of gravity CG is unstable. However, in this embodiment, since the rear balancer Br and the front balancer Bf are disposed on the right side (that is, on the clutch 38 side) with respect to the first plane $P_1$, the weight of the AC generator 37 positioned on the left side is balanced against the weights of the clutch 38, the rear balancer Br and the front balancer Bf on the right side. Thus, the entire weight of the engine E can be suitably balanced on the right and left sides.

Next, the assembling of the rear balancer Br and the front balancer Bf and the elimination of backlash thereof will be described.

The rear balancer Br is assembled in the following procedure. First, the rear balancer weight 58, rear balancer gear 60, damper rubbers 59, . . . , 59, first needle bearing 56, second needle bearing 57, first thrust washer 61, and second thrust washer 62 are temporarily assembled in a state in which the upper casing 4 is fixed with the opening thereof being directed upwardly. The sub-assembly thus obtained is, as described above, inserted in the casing raised portion 41 from the opening portion of the upper casing 4 with the first thrust washer 61 and second thrust washer 62 being guided along the thrust washer guide faces $f_3$, $f_4$ respectively. Subsequently, the leading end of the rear balancer shaft 10 is inserted from the supporting hole 41b of the fourth journal supporting portion $25_4$ of the casing raised portion 41, passing through the interior of the sub-assembly, and is locked in the supporting hole 41a of the third journal supporting portion $25_3$.

Next, the idle gear 55, around the inner peripheral surface of which the ball bearing 53, 53 are previously assembled, is inserted from the opening portion of the upper casing 4 to mesh with the rear balancer gear 60, and in such a state the leading end of the idle shaft 11 is inserted from the supporting hole 25b of the fourth journal supporting portion $25_4$ of the upper casing 4 so as to pass through the ball bearings 53, 53 and the collar 52. At this time, the idle gear 55 is displaced to a positioned shown by a chain line in FIG. 5. When the idle gear 55 is located at the above displaced position, it keeps the meshing relationship with the rear balancer gear 60.

Then, the rear balancer gear 60 is rotated by the operator's finger inserted from the opening portion 41c of the casing raised portion 41 to align the phase alignment mark 60a thereof with the phase alignment mark 63a of the rib 63. In such a state, the journal portions $23_1$ to $23_5$ of the crank shaft 3 are fitted in the journal supporting portions $25_1$ to $25_5$ of the upper casing 4, respectively. At this time, since the idle gear 55 is displaced to the position shown by the broken line as described above, the balancer drive gear 51 of the crank shaft 3 does not mesh with the idle gear 55. The crank shaft is then rotated to position, for example, the first pin portions $24_1$, $24_4$ at top dead centers, and in such a state, the idle gear 55 is slid to a position shown by a solid line in FIG. 5 to mesh the balanced drive gear 51, and then the idle shaft 11 is locked in the supporting hole 25a.

According to the above procedure, the rear balance gear 60 can be assembled in such a state so as to have a specific phase against the phase of the crank shaft 3.

The front balancer Bf is assembled in the following procedure. The front balancer shaft 9 and the front balancer weight 67 are assembled in the lower casing 5 with the front balancer gear 71 being temporarily fixed in such a manner so as to have a specific phase. The lower casing 5 is then joined to the upper casing 4 to which the crank case 3 is temporarily fixed in such a manner as to have a specific phase. The assembling of the front balancer Bf can be easily performed because it is disposed at a shallow position from the opening portion of the lower casing 5.

Figure 9A:
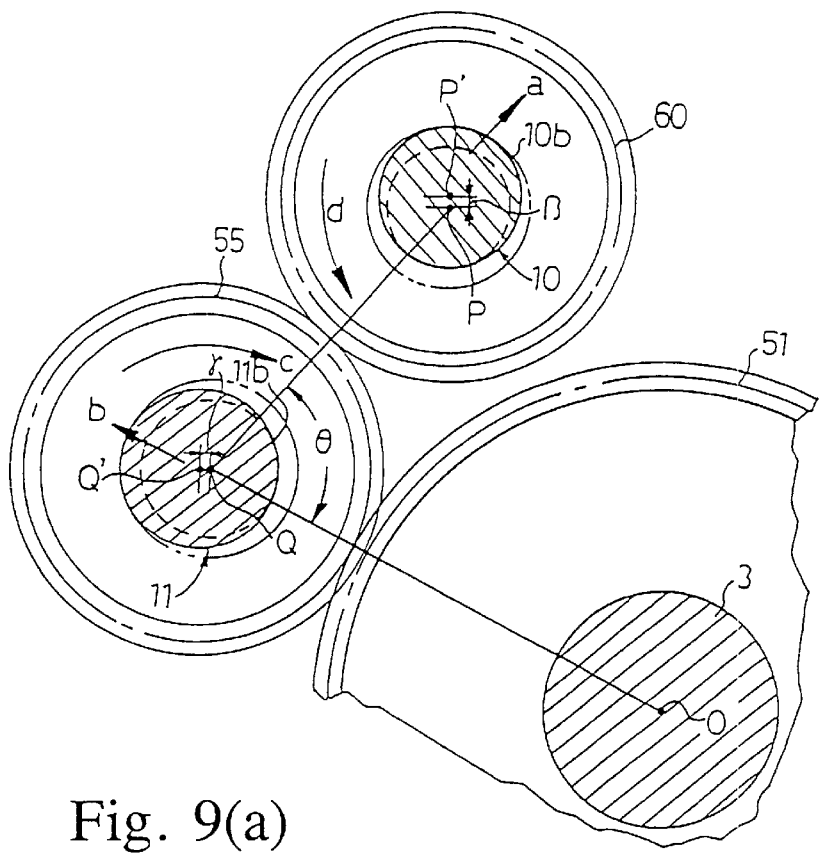
FIGS. 9(A) and 9(B) are views illustrating the function of the present invention.

The backlash adjustment of the rear balancer Br is performed by adjusting rotational positions of the rear balancer shaft 10 as the eccentric shaft and the idle shaft 11. As shown in FIG. 9(A), an axial line P' of the eccentric portion 10b supporting the first needle bearing 56 and second needle bearing 57 is eccentric a distance $\beta$ from an axial line P of both the end portions of the rear balancer shaft 10 supported by the third journal supporting portion $25_3$ and fourth journal supporting portion $25_4$ of the casing raised portion 41. An axial line Q' of the eccentric portion 11b supporting the idle gear 55 is eccentric a distance $\gamma$ from an axial line Q of both the end portions of the idle shaft 11 supported by the third journal portion $25_3$ and fourth journal portion $25_4$ of the upper casing 4. Further, if O is an axial line of the crank shaft 3, an angle formed by a line QO and a line QP is set at about 90°.

First, as shown in FIG. 9(A), the eccentric portion 10b (shown by hatching) of the rear balancer shaft 10 is made eccentric along an arrow "a" substantially parallel to the direction of the line QP and is temporarily fixed. The eccentric portion 11b (shown by hatching) of the idle shaft 11 is made eccentric along an arrow tab substantially parallel to the direction of the line OQ and is temporarily fixed. At this time, the meshing of the rear balancer gear 60 with the idle gear 55 is loosened and the meshing of the idle gear 55 with the balancer drive gear 51 is also loosened.

Figure 9B:
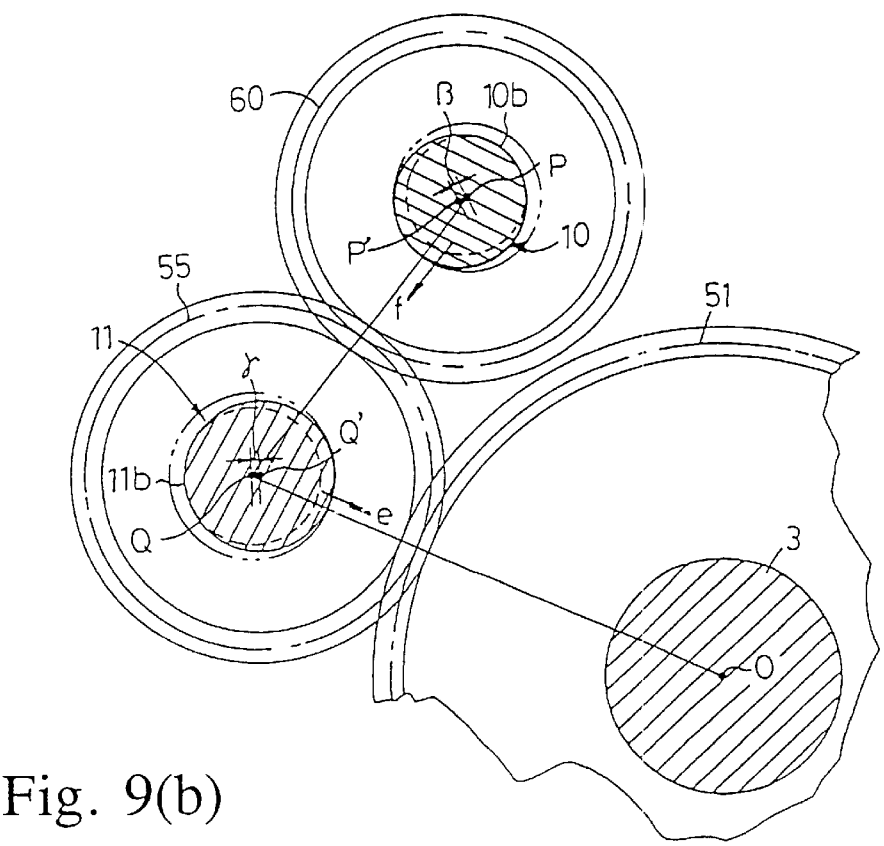

In such a state, by rotating the idle shaft 11 a specific angle (for example, about 120°) along the direction "c" in FIG. 9(A) and fixing it, the axial line Q' of the eccentric portion 11b of the idle shaft 11 is moved along the direction "e" in FIG. 9(B) where it comes closer to the crank shaft 3, thus suitably adjusting a backlash between the balancer drive gear 51 and the idle gear 55. At this time, the distance between the idle gear 55 and the rear balancer gear 60 is slightly reduced. However, since the meshing of the idle gear 55 with the rear balancer gear 60 is loosened, the idle gear 55 can be smoothly moved along the direction "e."

After the backlash between the balancer drive gear 51 and the idle gear 55 is thus adjusted, the rear balancer shaft 10 is rotated a specific angle (for example 90°) along the direction "d" in FIG. 9(A) and fixed. As a result, the rear balancer gear 60 is moved in the direction "f" in FIG. 9(B), so that the backlash between the rear balancer gear 60 and the idle gear 55 is adjusted to a suitable value. At this time, since the distance between the idle gear 55 and the rear balancer gear 60 is slightly reduced at the previous step, the movement of the rear balancer 60 in the direction "f" is small. Of course, the movement of the rear balancer gear 60 in the direction "f" does not exert any effect on the already adjusted backlash between the balancer drive gear 51 and the idle gear 55.

The adjustment of the backlash of the front balancer Bf can be easily performed only by rotating the front balancer shaft 9 having the eccentric portion 9b. Specifically, since the axial line of the eccentric portion 9b supporting the front balancer gear 71 is eccentric a specific distance from the axial line of both the end portions of the front balancer shaft 9 supported by the third journal supporting portion $26_3$ and fourth journal supporting portion $26_4$ of the lower casing 5, the front balancer gear 71 is moved close to/apart from the balancer drive gear 51 of the crank shaft 3. The backlash of the front balancer Bf is thus adjusted.

Figure 10:
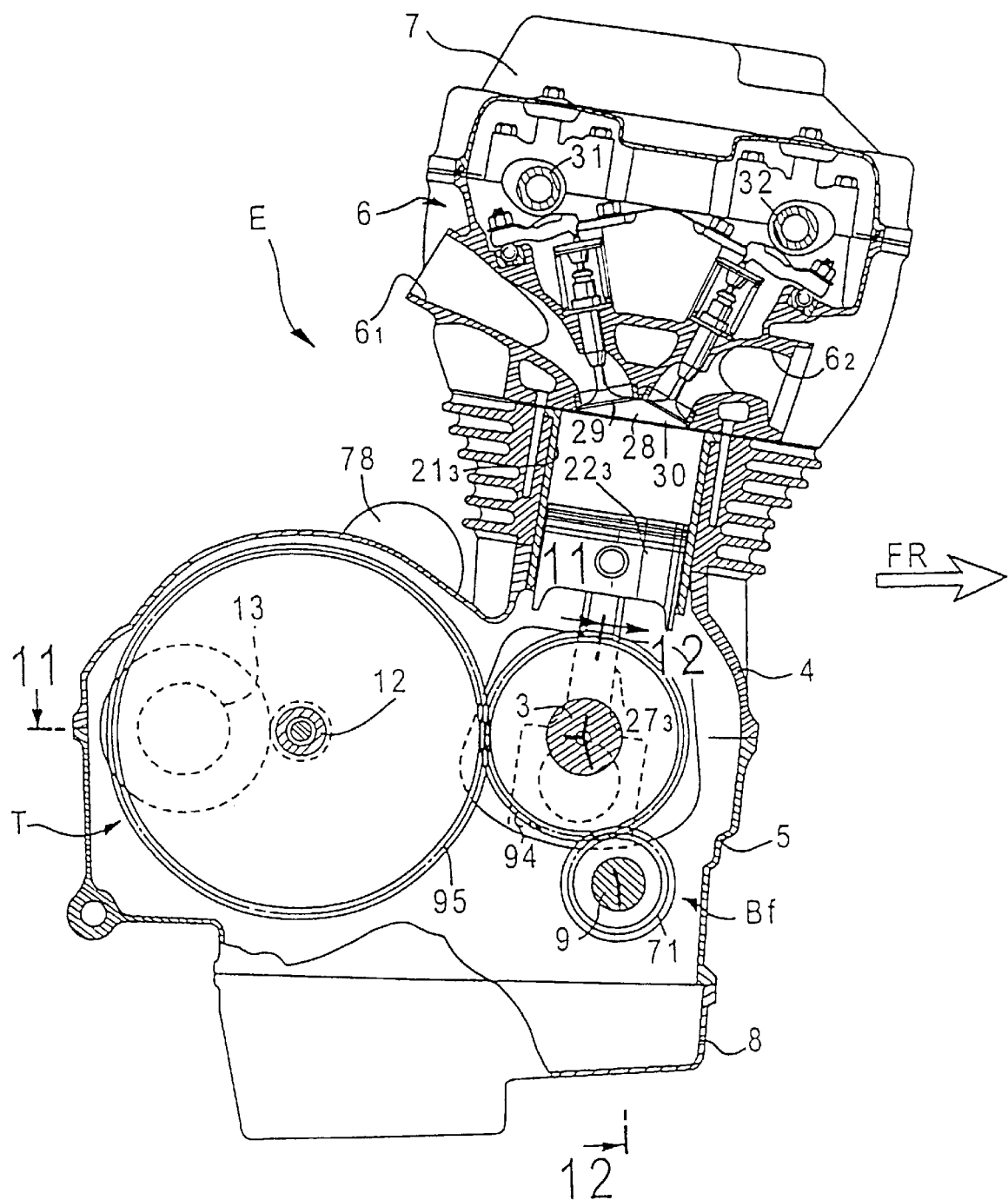
FIG. 10 is a side view showing the entire configuration of an engine according to a second embodiment.
Figure 11:
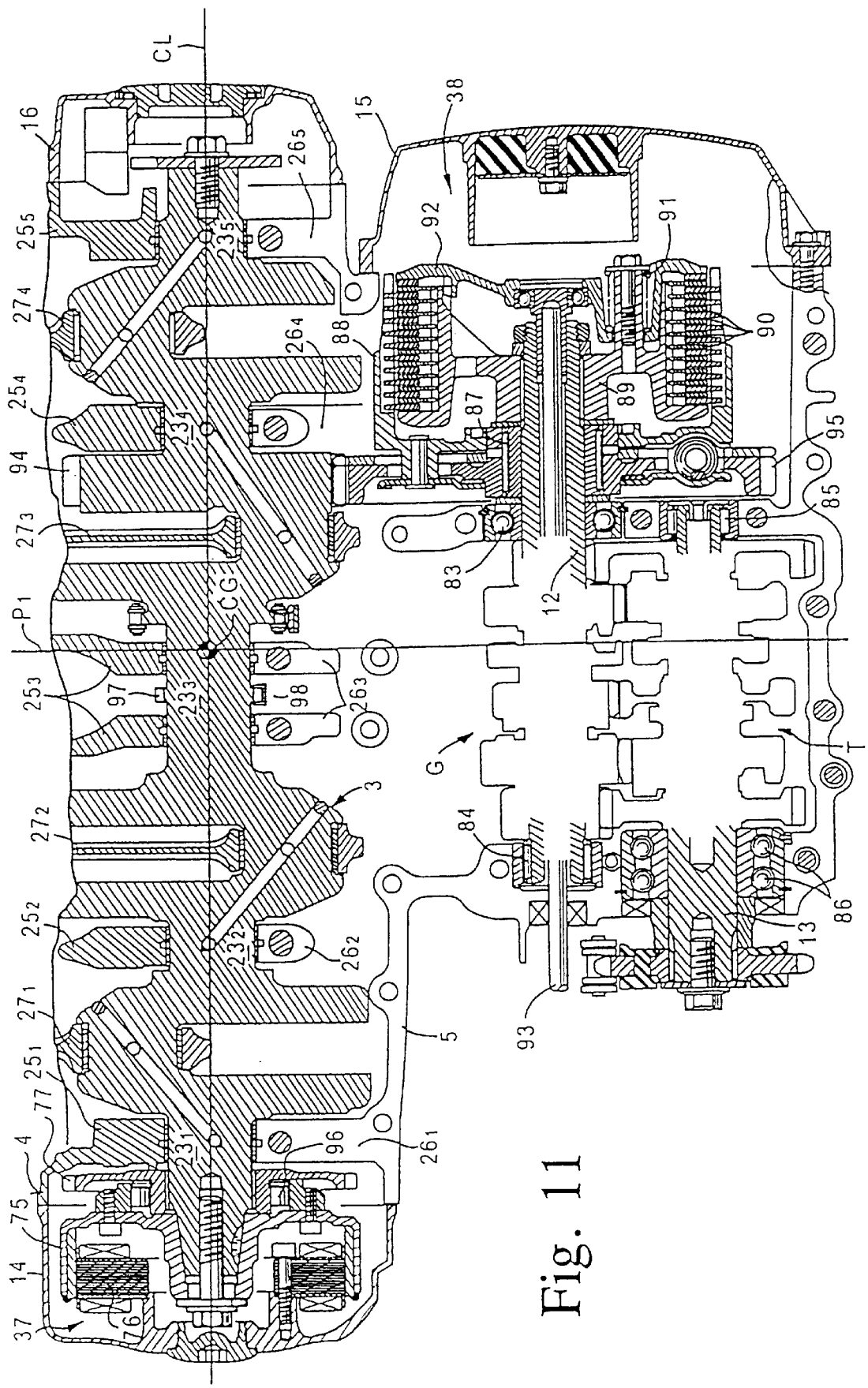
FIG. 11 is a sectional view taken on line 11—11 of FIG. 10.
Figure 12:
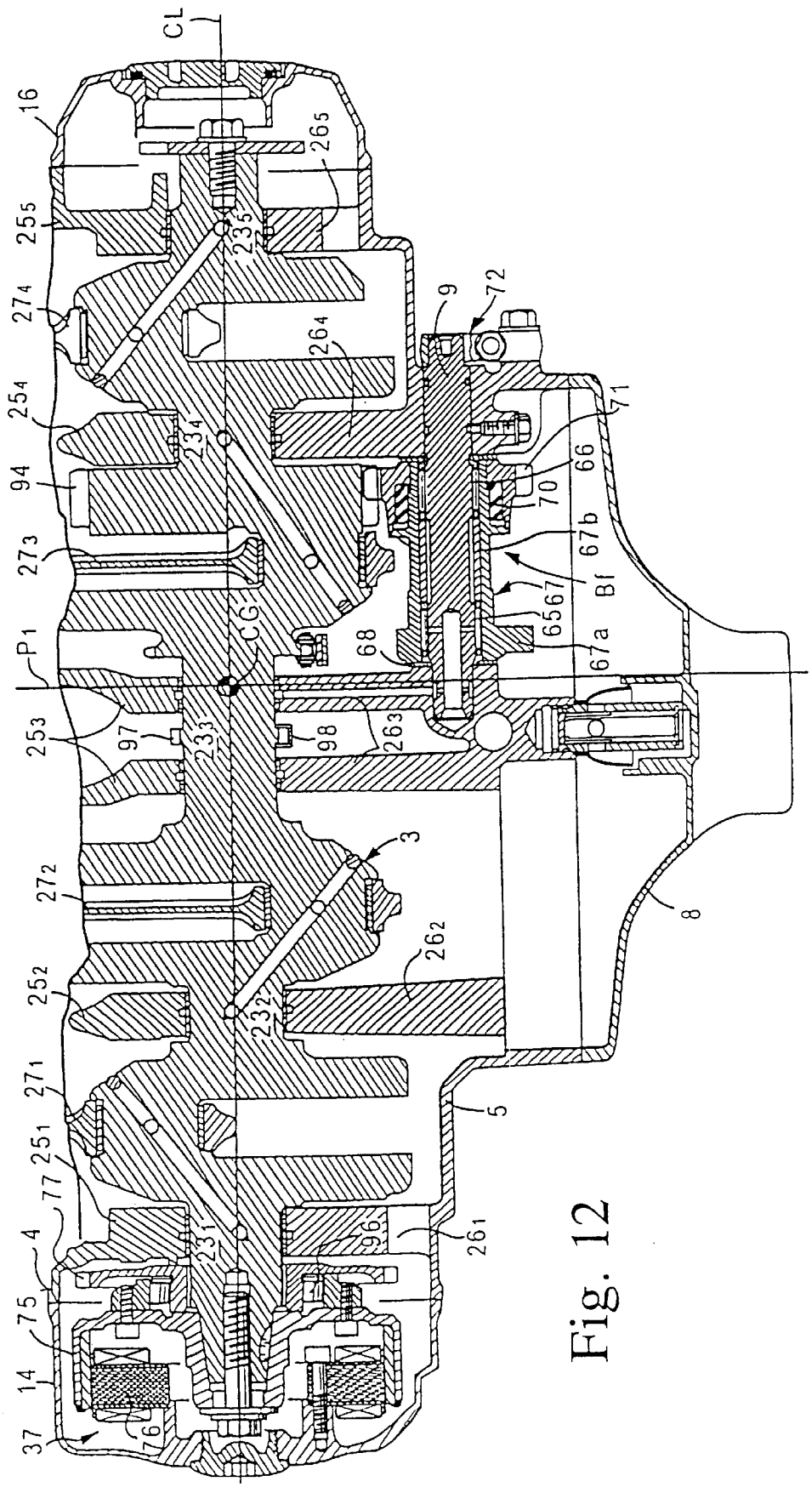
FIG. 12 is a sectional view taken on line 12—12 of FIG. 10.

FIGS. 10 to 12 show a second embodiment of the present invention. In this embodiment, parts corresponding to those shown in the first embodiment are indicated by the same characters.

The second embodiment is different from the first embodiment mainly in that the front balancer Bf and the rear balancer Br are provided in the first embodiment. However, in the second embodiment, the rear balancer Br is omitted and a secondary balancer device is composed of only a front balancer Bf The structure of the front balancer Bf is substantially the same as that in the first embodiment, except for a weight applied to a front balancer weight 67.

A front balancer shaft 9 supporting the front balancer weight 67 is hung between the third journal supporting portion $26_3$ and fourth journal supporting portion $26_4$ positioned forward and downwardly from a crank shaft 3. The front balancer weight 67 includes a weight portion 67a and a cylindrical shaft portion 67b, and is rotatably supported on an outer periphery of the front balancer shaft 9 through a first needle bearing 65 and a second needle bearing 66. A front balancer gear 71 joined on an outer periphery of the cylindrical shaft portion 67b through a damper rubber 70 meshes with a drive gear 94 provided on the weight portion adjacent to the third journal portion $23_4$ of the crank shaft 3. The drive gear 94 drives a driven gear 95 provided on the main shaft 12 of the transmission T. Accordingly, the drive gear 94 is commonly used for transmitting power to the transmission T and for transmitting power to the front balancer Bf In the first embodiment, the timing gear for driving the cam shafts 31, 32 (see FIG. 4) is provided at the axial end portion of the crank shaft 3. However, in the second embodiment, a timing gear 97 is provided at a central portion (third journal portion $23_3$) of the crank shaft 3. Accordingly, a space is formed in the third journal supporting portion $25_3$ of the upper casing 4 and in the third journal supporting portion $26_3$ of the lower casing 5, and the timing gear 97 and a timing chain 98 are contained in the space.

Even in the second embodiment, the AC generator 37 is provided at the left end of the crank shaft 3 positioned on the left side with respect to the fist plane $P_1$ passing through the center of gravity CG, while the clutch 38 is provided at the right end of the main shaft 12 positioned on the right side with respect to the plane $P_1$. Further, the front balancer Bf is provided on the right side with respect to the plane $P_1$. Accordingly, if the AC generator 37 is separated from the first plane $P_1$ at a large distance and generates a large moment around the center of gravity CG, the moment is balanced against the total of a reverse moment generated by the clutch 38 and a reverse moment generated by the front balancer Bf. Thus, the weight balance of the engine E can be suitably maintained on the right and left sides.

While the preferred embodiment of the present invention has been described using specific terms, such description is illustrative purposes only, and it is to be understood that many changes in design may be made without departing from the scope of the invention.

As described above, according to the present invention, since an AC generator is disposed at an end portion of a crank shaft, it is possible to eliminate the necessity of providing a shaft specialized for supporting the AC generator and hence to reduce the number of parts, and also to reduce the radial dimension of the engine as seen from the crank shaft. Further, since the AC generator and a clutch are disposed on one side and the other side with respect to a plane passing through the center of gravity of the engine respectively and balancers are disposed on the clutch side which is smaller in distance from the plane than the AC generator side, the weight of the AC generator is balanced against the weights of the clutch and the balancers. As a result, it is possible to suitably keep a preferable weight balance of the engine along the direction of the crank shaft.

According to the present invention, since the balancers are supported on journal supporting walls of the casings, it is possible to enhance the supporting rigidity of the balancers and hence to improve the vibration preventive effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine having a front portion and a rear portion with a balancer device comprising:
    a casing;
    a crank shaft and a transmission shaft being mounted for rotation within said casing, said crank shaft and said transmission shaft being substantially parallel to each other; and
    balancers provided in proximity to said crank shaft;
    an AC generator disposed at an end portion of said crank shaft on one side with respect to a plane passing through a center of gravity of an engine, said plane being substantially orthogonally disposed relative to the crankshaft;
    a clutch disposed at an end portion of said transmission shaft on the other side with respect to said plane in such a manner to be separated from said plane by a shorter distance relative to a distance between said AC generator and said plane; and
    two balancer gears disposed on a second plane and rotated by a balancer drive gear integrally formed on an outer periphery of a balancer portion of the crank shaft and two balancer weight portions of each balancers being both disposed on a third plane position adjacent to the plane including the center of gravity.

2. The engine having a front portion and a rear portion with a balancer device according to claim 1, wherein said balancers are supported on journal supporting walls of said casings.

3. The engine having a front portion and a rear portion with a balancer device according to claim 1, wherein said balancers include a front balancer shaft mounted substantially parallel to said crank shaft, a front balancer weight being positioned on said front balancer shaft for reducing secondary vibration.

4. The engine having a front portion and a rear portion with a balancer device according to claim 3, and further including needle bearings for supporting said front balancer shaft for rotation relative to said casing.

5. The engine having a front portion and a rear portion with a balancer device according to claim 4, and further including a front balancer gear having a plurality of gear teeth and being mounted on said front balancer shaft wherein said plurality of gear teeth mesh with a drive gear for rotating said front balancer shaft in a reverse direction and at twice the rotational speed relative to said crank shaft.

6. The engine having a front portion and a rear portion with a balancer device according to claim 3, wherein said front balancer shaft is disposed ahead of and beneath the crank shaft.

7. The engine having a front portion and a rear portion with a balancer device according to claim 1, wherein said balancers include a rear balancer shaft mounted substantially parallel to said crank shaft, a rear balancer weight being positioned on said rear balancer shaft for reducing secondary vibration.

8. The engine having a front portion and a rear portion with a balancer device according to claim 7, and further including needle bearings for supporting said rear balancer shaft for rotation relative to said casing.

9. The engine having a front portion and a rear portion with a balancer device according to claim 8, and further including a rear balancer gear having a plurality of gear teeth and being mounted on said rear balancer shaft wherein said plurality of gear teeth mesh with a drive gear for rotating said rear balancer shaft in a direction of rotation of said crank shaft and at twice the rotational speed relative to said crank shaft.

10. The engine having a front portion and a rear portion with a balancer device according to claim 4, wherein said rear balancer shaft is disposed behind and above the crank shaft.

11. An engine having a front portion and a rear portion with a balancer device comprising:
    a casing;
    a crank shaft and a transmission shaft being mounted for rotation within said casing, said crank shaft and said transmission shaft being substantially parallel to each other; and
    balancers provided in proximity to said crank shaft;
    an AC generator disposed at an end portion of said crank shaft on one side with respect to a plane passing through a center of gravity of an engine, said plane being substantially orthogonally disposed relative to the crankshaft; and
    a clutch disposed at an end portion of said transmission shaft on the other side with respect to said plane in such a manner to be separated from said plane by a shorter distance relative to a distance between said AC generator and said plane;
    said balancers being disposed between said plane and said clutch and include a front balancer shaft mounted substantially parallel to said crank shaft, a front balancer weight being positioned on said front balancer shaft for reducing secondary vibration with said front balancer shaft being disposed ahead of and beneath the crank shaft.

12. The engine having a front portion and a rear portion with a balancer device according to claim 11, wherein said balancers are supported on journal supporting walls of said casings.

13. The engine having a front portion and a rear portion with a balancer device according to claim 11, wherein said balancers include a rear balancer shaft mounted substantially parallel to said crank shaft, a rear balancer weight being positioned on said rear balancer shaft for reducing secondary vibration.

14. The engine having a front portion and a rear portion with a balancer device according to claim 13, and further including needle bearings for supporting said rear balancer shaft for rotation relative to said casing.

15. The engine having a front portion and a rear portion with a balancer device according to claim 14, and further including a rear balancer gear having a plurality of gear teeth and being mounted on said rear balancer shaft wherein said plurality of gear teeth mesh with a drive gear for rotating said rear balancer shaft in a direction of rotation of said crank shaft and at twice the rotational speed relative to said crank shaft.

16. The engine having a front portion and a rear portion with a balancer device according to claim 11, and further including needle bearings for supporting said front balancer shaft for rotation relative to said casing.

17. The engine having a front portion and a rear portion with a balancer device according to claim 16, and further including a front balancer gear having a plurality of gear teeth and being mounted on said front balancer shaft wherein said plurality of gear teeth mesh with a drive gear for rotating said front balancer shaft in a reverse direction and at twice the rotational speed relative to said crank shaft.

18. An engine having a front portion and a rear portion with a balancer device comprising:

a casing;

a crank shaft and a transmission shaft being mounted for rotation within said casing, said crank shaft and said transmission shaft being substantially parallel to each other; and balancers provided in proximity to said crank shaft;

an AC generator disposed at an end portion of said crank shaft on one side with respect to a plane passing through a center of gravity of an engine, said plane being substantially orthogonally disposed relative to the crankshaft; and a clutch disposed at an end portion of said transmission shaft on the other side with respect to said plane in such a manner to be separated from said plane by a shorter distance relative to a distance between said AC generator and said plane;

said balancers being disposed between said plane and said clutch and include a rear balancer shaft mounted substantially parallel to said crank shaft, a rear balancer weight being positioned on said rear balancer shaft for reducing secondary vibration with said rear balancer shaft being disposed behind and above the crank shaft.

19. The engine having a front portion and a rear portion with a balancer device according to claim 18, wherein said balancers are supported on journal supporting walls of said casings.

20. The engine having a front portion and a rear portion with a balancer device according to claim 18, and further including needle bearings for supporting said front balancer shaft for rotation relative to said casing.

21. The engine having a front portion and a rear portion with a balancer device according to claim 20, and further including a front balancer gear having a plurality of gear teeth and being mounted on said front balancer shaft wherein said plurality of gear teeth mesh with a drive gear for rotating said front balancer shaft in a reverse direction and at twice the rotational speed relative to said crank shaft.

22. The engine having a front portion and a rear portion with a balancer device according to claim 18, and further including needle bearings for supporting said rear balancer shaft for rotation relative to said casing.

23. The engine having a front portion and a rear portion with a balancer device according to claim 22, and further including a rear balancer gear having a plurality of gear teeth and being mounted on said rear balancer shaft wherein said plurality of gear teeth mesh with a drive gear for rotating said rear balancer shaft in a direction of rotation of said crank shaft and at twice the rotational speed relative to said crank shaft.

\* \* \* \* \*